March 28, 1961 F. W. BROOKS 2,976,957
BRAKE STRUCTURE

Filed July 3, 1958 2 Sheets-Sheet 1

INVENTOR.
Frank W. Brooks.
BY D. C. Staley
His Attorney.

March 28, 1961 F. W. BROOKS 2,976,957
BRAKE STRUCTURE
Filed July 3, 1958 2 Sheets-Sheet 2

INVENTOR.
Frank W. Brooks.
BY
His Attorney.

United States Patent Office 2,976,957
Patented Mar. 28, 1961

2,976,957
BRAKE STRUCTURE

Frank W. Brooks, Dayton, Ohio, assignor to General Motors Corporation, Detroit, Mich., a corporation of Delaware Filed July 3, 1958, Ser. No. 746,456
3 Claims. (Cl. 188—78)

This invention relates to vehicle brakes and particularly to drum type brakes that include an annular brake drum engaged by arcuate brake shoes that have an arcuate rim portion supporting a brake lining with the rim portion reinforced by a web portion that is normal to the rim portion, the edge of the rim portion engaging and being supported on a stationary backing plate with respect to which the brake shoe is movable on actuation thereof by brake actuating mechanism.

Metallic engagement of the rim of the brake shoe with the backing plate results in squeaking of the brake when the brake shoe rim moves over the surface of the backing plate on actuation of the brake. This is particularly true after the brakes have been in use for some period of time during which the metallic surface of the backing plate engaged by the brake shoe rim has become corroded or rusted or roughened.

Attempts have been made to eliminate the brake noise or squeak usually by smearing a small amount of grease on the surface or surfaces of the backing plate engaged by the brake shoe rim. This has been, at best, merely a temporary fix because as soon as the grease becomes hardened by ageing or is scraped from the surfaces of backing plate by constant rubbing of the brake shoe edge the noise returns and the temporary fix must be applied again.

It is, therefore, an object of this invention to provide a structural arrangement on the backing plate surface or surfaces engaged by the brake shoe rim that will greatly extend the lubrication period between the rim and the backing plate surfaces engaged thereby by providing shallow reservoirs of lubricant in the backing plate surfaces engaged by the brake shoe rim.

It is another object of the invention to provide the backing plate support surfaces engaged by a brake shoe rim with shallow reservoirs of lubricant wherein the reservoirs are formed by depressions in the support surfaces, the depressions preferably having a semi-spherical shape, the said support surfaces being disposed vertically so that lubricant disposed in the reservoirs will gradually creep downwardly from the reservoirs onto the said support surface and thereby provide for a continuous supply of lubricant between the support surface and the brake shoe rim.

It is another object of the invention to provide the lubricant reservoirs in the support surfaces of the backing plate for the brake shoe rim in staggered arrangement, preferably in longitudinally extending rows with alternate rows of depressions staggered with respect to rows of depressions thereadjacent so that the constant movement of the brake shoe rim over the support surface will tend to shift the lubricant on the support surface from one reservoir to another and thereby avoid scraping the lubricant aside from the arc of movement between the support surface and the brake shoe rim such as is occasioned when one flat surface rubs over another flat surface.

Further objects and advantages of the present invention will be apparent from the following description, reference being had to the accompanying drawings wherein a preferred embodiment of the present invention is clearly shown.

Figure 1:
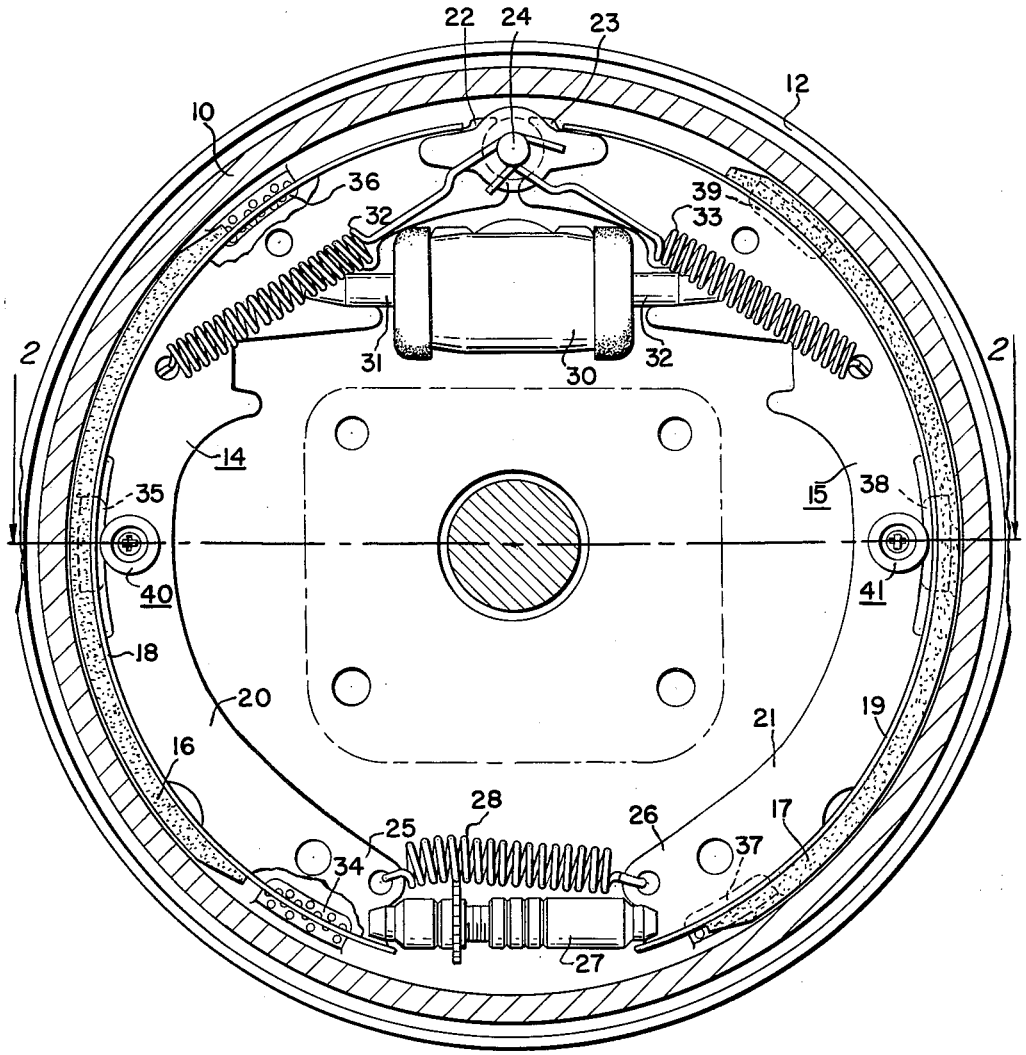
Figure 1 is an elevational view of a brake incorporating features of this invention.
Figure 2:
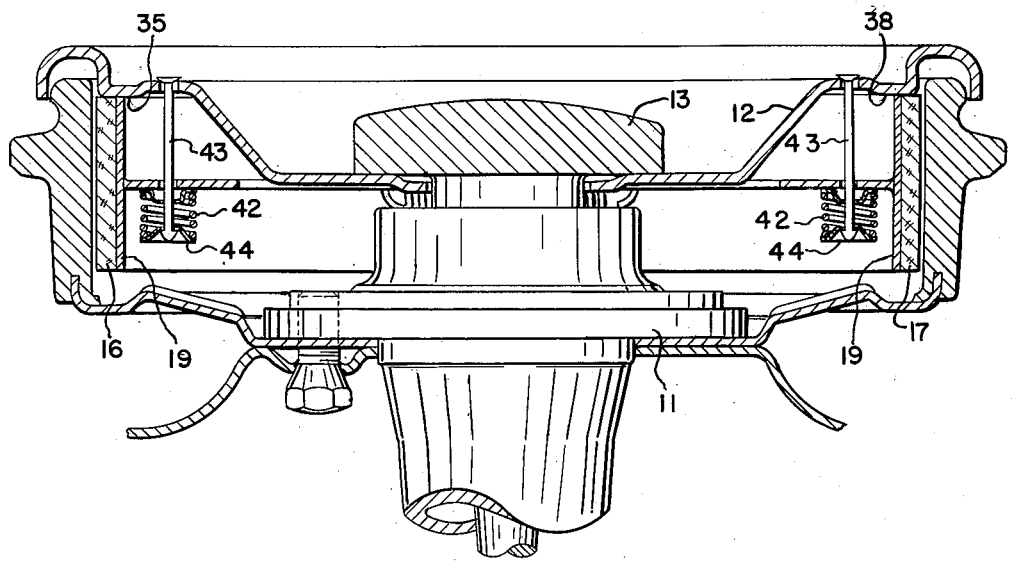
Figure 2 is a cross-sectional view taken along line 2—2 of Figure 1.

In this invention, the brake consists of a brake drum that is carried on the wheel hub 11 and rotates with the same. A backing plate 12 is stationarily carried on a stationary part 13 of the vehicle.

Brake shoes 14 and 15 are in the form of arcuate segments and have lining elements 16 and 17 adapted to engage the brake drum 10. The brake shoes 14 and 15 each comprise arcuate rim sections 18 and 19 supporting the lining elements 16 and 17. The rim sections 18 and 19 are reinforced against flexure by the web portions 20 and 21 disposed normal to the rim portions 18 and 19.

Adjacent cooperating ends 22 and 23 of the brake shoes 14 and 15 engage an anchor pin 24 stationarily affixed to the backing plate 12. Opposite adjacent ends 25 and 26 of the brake shoes 14 and 15 engage an adjusting strut 27 with the shoe ends 25 and 26 being retained in engagement with the adjusting strut by means of a tension spring 28. The brake shoes 14 and 15 are thus suspended on the anchor pin 24 and can move transversely of the brake drum 10 about the anchor pin 24 as a pivot whenever the brake shoes are out of engagement with the brake drum.

An hydraulic wheel cylinder 30 having plunger members 31 and 32 extending from opposite ends thereof into engagement with the webs 20 and 21 provides the actuating device for moving the brake shoes 14 and 15 into engagement with the brake drum 10. The plunger members 31 and 32 extend from piston members within the wheel cylinder 30, hydraulic fluid being delivered into the wheel cylinder to between the piston members from a conventional brake pedal operated master cylinder, not shown. Retraction springs 32 and 33 normally retain the ends 22 and 23 of the brake shoes in engagement with the anchor pin 24 when hydraulic pressure is released from the wheel cylinder 30.

To retain the shoes 14 and 15 in alignment with each other and with the anchor pin 24, a plurality of planar support pad areas 34, 35, 36, 37, 38, 39 are provided on the backing plate 12. The support pad areas are each identical, one of which is more specifically shown in Figures 3 and 4. Each of the shoes 14 and 15 engage three support pad areas as shown in Figure 1, the rims 18 and 19 of the shoes 14 and 15 respectively engaging their respective pad areas. The support pad areas are positioned vertically when the brake is mounted on a vehicle and all pad areas are in a common plane whereby the brake shoes 14 and 15 are held in alignment rims 18 and 19 engaging the planarly dispersed pad areas 34 to 39 inclusive.

The brake shoe rims 18 and 19 are held in engagement with the support pads 34 to 39 inclusive resiliently by means of spring assemblies 40 and 41 each of which consists of a spring 42 held under compression by a rod 43 that extends from the backing plate 12 and has a cap 44 to hold the spring between the cap and the web of the brake shoe whereby to hold the brake shoe rim in frictional engagement with the support pad areas 34 to 39 inclusive.

From the foregoing description, it will be apparent that the brake shoes 14 and 15 move relative to the backing plate and over the support pad areas whenever the brakes are applied and released and when released the shoe assembly can move as a unit over the support pad areas about the anchor pin 24 as a pivot when the vehicle travels over rough roads.

Figure 3:
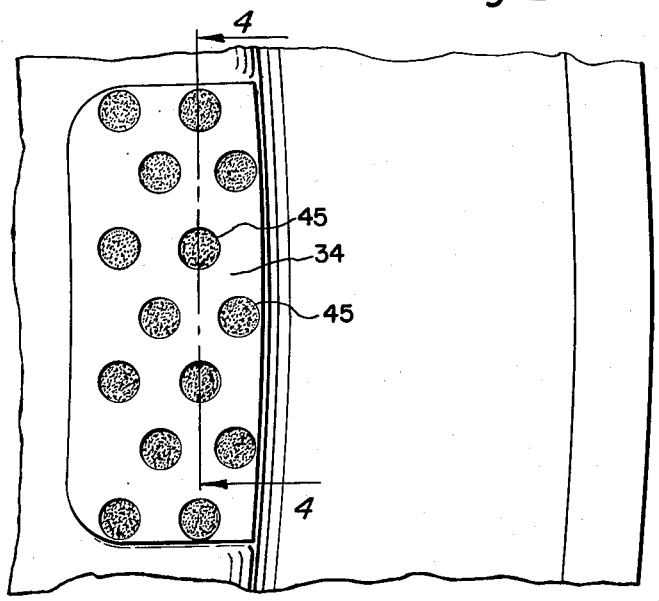
Figure 3 is an enlarged elevational view of one of the support surfaces on the backing plate that is engaged by a brake shoe rim edge.
Figure 4:
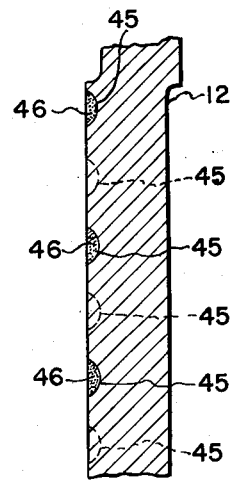
Figure 4 is a cross-sectional view taken along line 4—4 of Figure 3.

To avoid metal to metal squeaking noise when the brake shoes move relative to the support pad areas, each support pad area is provided with a plurality of depressions 45 as more clearly shown in Figures 3 and 4. These depressions are filled with a lubricating material 46, such as a semisolid grease or any other comparable or similar lubricant whereby a long-time supply of lubricant is provided for supply to the support pad surface 34. These depressions 45 are arranged in longitudinally extending rows in each of the support pads that are at least twice as long as they are wide to give a substantial length support to the brake shoe rims. Alternate rows of depressions are staggered relative to adjacent rows as shown in Figure 3. Thus, as the rim of the brake shoes moves over the surface of the support pad, the lubricant on the surface of the support pad is tended to be shifted from one depression to another so that the lubricant reservoirs tend to resupply one another as a result of the movement of the shoe rim on the support pad surfaces. The arrangement thus conserves the lubricant supply over a long period of time.

Also, the lubricant reservoirs or depressions 45 are semi-spherical in shape, as shown in Figure 4, so that when the brake is in place on a vehicle the disposition of the support pad surfaces in a vertical plane tends to provide for a gradual creeping of the lubricant downwardly from the reservoir depressions 45 to be fed out gradually at the bottom edge of the reservoir depression onto the support pad surface with the result that the support pad surfaces are continuously lubricated for movement of the brake shoe rim thereover.

While the embodiments of the invention as herein disclosed constitute preferred forms, it is to be understood that other forms might be adopted.

What is claimed is as follows:

1. A brake comprising a vertically positioned backing plate, said plate having a plurality of open faced vertically extending and circumferentially positioned brake shoe support wear surface areas, a brake shoe having a rim having a longitudinally extending wear and support edge and a web positioned on said plate with said rim edge engaging and supported on said open faced support areas, said support areas each having a plurality of depressions in the surface thereof distributed over the surface of the support area open in the plane of reciprocation of the shoe rim on the support area over the depressions and retaining therein a lubricant to provide thereby for lubrication between the said vertically positioned support areas and said rim edge on reciprocal movement of the rim edge on said open faced support areas with the said reciprocal movement of the rim edge effecting continuous redistribution of the lubricant between the depressions to retain the lubricant in the depressions for extended re-use on the vertically positioned support surface areas.

2. A brake comprising a vertically positioned backing plate, said plate having a plurality of open faced vertically extending and circumferentially positioned brake shoe support wear surface areas, a brake shoe having a rim having a longitudinally extending wear and support edge and a web positioned on said plate with said rim edge engaging and supported on said open face support areas, said support areas each having a plurality of depressions in the surface thereof distributed over the surface of the support area in adjacent longitudinally extending rows with the depressions of alternate rows staggered in relation to adjacent rows of depressions that are open in the plane of reciprocation of the shoe rim edge on the support area in moving over the depressions and retaining therein a lubricant exudable along the bottom edges of the said depressions onto the vertical surface areas of the said support areas to provide thereby for lubrication between the said vertically positioned support areas and the said rim edge on reciprocable movement on the rim edge on the support areas with the said reciprocable movement of the rim edge effecting continuous redistribution of the lubricant from the surface of the support area into the depressions therein to retain the lubricant in the depressions for extended reuse on the vertically positioned support surface areas.

3. A brake structure as set forth in claim 2 wherein the said depressions are semispherical in contour to provide for maximum flow of lubricant from the depressions.

References Cited in the file of this patent

UNITED STATES PATENTS

| | | |
|---|---|---|
| 1,746,020 | Whiteley | Feb. 4, 1930 |
| 2,190,217 | Patch | Feb. 13, 1940 |
| 2,294,329 | Ayers et al. | Aug. 25, 1942 |
| 2,509,643 | House | May 30, 1950 |
| 2,796,954 | Kaiser | June 25, 1957 |